United States Patent
Hughes et al.

(10) Patent No.: US 12,021,653 B2
(45) Date of Patent: Jun. 25, 2024

(54) ACCESS CONTROL EMBEDDED INTO NETWORK GEAR

(71) Applicant: Schlage Lock Company LLC, Carmel, IN (US)

(72) Inventors: Daniel Hughes, Fishers, IN (US); Brian A. Telljohann, Indianapolis, IN (US)

(73) Assignee: Schlage Lock Company LLC, Carmel, IN (US)

( * ) Notice: Subject to any disclaimer, the term of this patent is extended or adjusted under 35 U.S.C. 154(b) by 280 days.

(21) Appl. No.: 17/365,449

(22) Filed: Jul. 1, 2021

(65) Prior Publication Data

US 2023/0006861 A1     Jan. 5, 2023

(51) Int. Cl.
| | |
|---|---|
| *H04L 12/40* | (2006.01) |
| *G07C 9/00* | (2020.01) |
| *H04L 12/10* | (2006.01) |

(52) U.S. Cl.
CPC .... *H04L 12/40045* (2013.01); *G07C 9/00309* (2013.01); *H04L 12/10* (2013.01); *H04L 12/40123* (2013.01); *G07C 2009/00523* (2013.01)

(58) Field of Classification Search
None
See application file for complete search history.

(56) References Cited

U.S. PATENT DOCUMENTS

| | | | | |
|---|---|---|---|---|
| 2006/0294103 A1* | 12/2006 | Wood | ............ | H04L 63/105 |
| | | | | 707/999.009 |
| 2007/0200665 A1* | 8/2007 | Studerus | ............ | G07C 9/27 |
| | | | | 340/5.5 |
| 2012/0060042 A1* | 3/2012 | Buhari | ............ | G06F 1/266 |
| | | | | 713/340 |
| 2012/0198246 A1* | 8/2012 | German | ............ | H04Q 1/142 |
| | | | | 713/300 |
| 2012/0206299 A1* | 8/2012 | Valdes-Garcia | ....... | H04B 7/145 |
| | | | | 343/915 |
| 2014/0362729 A1* | 12/2014 | Michaud | ............ | H04B 7/10 |
| | | | | 370/254 |

(Continued)

OTHER PUBLICATIONS

Door Service Router 5.0; ASSA ABLOY; https://content.assaabloyusa.com/doc/AADSS1010293; 2 pages.

(Continued)

*Primary Examiner* — Christopher T Wyllie
(74) *Attorney, Agent, or Firm* — Taft Stettinius & Hollister LLP

(57) ABSTRACT

A system of embedding access control logic into a network gear according to an embodiment includes a plurality of access control devices including corresponding lock mechanisms configured to control access through corresponding passageways, a headend access control system configured to manage access control data associated with the plurality of access control devices, and a network switch communicatively coupled to the headend access control system and comprising a smart communication manager, wherein the smart communication manager includes an application programming interface accessible by the headend access control system and translates commands received from the headend access control system into payloads readable by the plurality of access control devices.

19 Claims, 6 Drawing Sheets

(56) References Cited

U.S. PATENT DOCUMENTS

| | | | | |
|---|---|---|---|---|
| 2016/0350992 | A1* | 12/2016 | Telljohann | G07C 9/28 |
| 2017/0060645 | A1* | 3/2017 | Gasselin de Richebourg | G06F 9/54 |
| 2017/0079586 | A1* | 3/2017 | Geva | A61B 5/20 |
| 2017/0086204 | A1* | 3/2017 | Jung | H04W 28/0263 |
| 2018/0034655 | A1* | 2/2018 | Christopher | G06F 3/048 |
| 2018/0309748 | A1* | 10/2018 | Li | G06F 21/41 |
| 2019/0354690 | A1* | 11/2019 | Brigandi | H04W 12/126 |
| 2019/0371101 | A1* | 12/2019 | Friedli | G07C 9/00571 |
| 2019/0394219 | A1* | 12/2019 | Huang | G06F 9/455 |
| 2020/0051355 | A1* | 2/2020 | Mondrow | H04W 52/0248 |
| 2020/0219350 | A1* | 7/2020 | Gester | A61B 5/082 |
| 2020/0327758 | A1* | 10/2020 | Ma | G07C 9/00571 |
| 2020/0410797 | A1* | 12/2020 | Gomez Santamaria | G07C 9/00912 |
| 2021/0142601 | A1* | 5/2021 | Schoenfelder | H04L 67/125 |
| 2022/0068061 | A1* | 3/2022 | Mondrow | H04W 12/08 |
| 2023/0121268 | A1* | 4/2023 | Mueller | H04L 41/147 370/229 |

OTHER PUBLICATIONS

Oracode 660; Dormakaba; https://www.dormakaba.com/us-en/solutions/products/vacation-short-term-rental-solutions/keyless-door-locks/oracode-660-293114; 5 pages.

BLUEnet Wireless; Salto; https://www.saltosystems.com/en/product-range/explanation/31/salto-bluenet-wireless/; 3 pages.

DWETH101; Ciholas; https://www.ciholas.com/product/dweth101/; 3 pages.

E-Plex® Wireless Gateway/Router; Dormakaba; https://www.dormakaba.com/resource/blob/161208/47222192ba39a47ab0acbdcb33131391/804932-pdf-data.pdf; 2 pages.

* cited by examiner

ACCESS CONTROL EMBEDDED INTO NETWORK GEAR

BACKGROUND

Sophisticated access control systems often involve coordinating multiple systems managed and/or controlled by different entities. The current approach to such real-time access control solutions typically requires device-specific integrations to support each type of access control device for each access control partner. Such an approach is expensive, complicated, and time consuming to manage, and it drives access control partners to implement a bare minimum feature set to support access control device integration. This often results in inconsistent user experience, limited ability (if any) to remotely update fielded devices, and limited visibility (if any) into the product performance once deployed.

SUMMARY

One embodiment is directed to a unique system, components, and methods for embedding access control logic into a network gear or otherwise providing integrated access control. Other embodiments are directed to apparatuses, systems, devices, hardware, methods, and combinations thereof for embedding access control logic into a network gear or otherwise providing integrated access control.

According to an embodiment, a system of embedding access control logic into a network gear may include a plurality of access control devices including corresponding lock mechanisms configured to control access through corresponding passageways, a headend access control system configured to manage access control data associated with the plurality of access control devices, and a network switch communicatively coupled to the headend access control system and comprising a smart communication manager, wherein the smart communication manager includes an application programming interface accessible by the headend access control system and translates commands received from the headend access control system into payloads readable by the plurality of access control devices.

In some embodiments, the smart communication manager may be a containerized software application executable by the network switch.

In some embodiments, the network switch may be a Power-over-Ethernet switch.

In some embodiments, the system may further include a wireless access point configured to communicate with at least one access control device of the plurality of access control devices using a first wireless communication technology.

In some embodiments, the system may further include a smart antenna configured to communicate with the at least one access control device via Bluetooth Low Energy (BLE) communication, wherein the wireless access point is configured to communicate with the at least one access control device via the smart antenna.

In some embodiments, the system may further include a smart antenna configured to communicate with the at least one access control device via 900 MHz communication, wherein the wireless access point is configured to communicate with the at least one access control device via the smart antenna.

In some embodiments, the wireless access point may be a wireless router.

In some embodiments, the smart communication manager may be communicatively integrated with at least one Internet of Things (IoT) service.

According to another embodiment, a system may include a plurality of access control devices including corresponding lock mechanisms configured to control access through corresponding passageways, a headend access control system configured to manage access control data associated with the plurality of access control devices, a Power-over-Ethernet network switch communicatively coupled to the headend access control system, and a smart communication manager communicatively coupled to the Power-over-Ethernet network switch and including an application programming interface accessible by the headend access control system and configured to translate data received from the headend access control system into payloads readable by the plurality of access control devices.

In some embodiments, the system may further include a first smart antenna communicatively coupled with and powered by the Power-over-Ethernet network switch at a first port of the Power-over-Ethernet network switch, wherein the first smart antenna is configured to communicate with a first set of access control devices of the plurality of access control devices using a first wireless communication technology.

In some embodiments, the first smart antenna may be further configured to communicate with a second set of access control devices of the plurality of access control devices different from the first set of access control devices using a second wireless communication technology different from the first wireless communication technology.

In some embodiments, the first wireless communication technology may use Bluetooth Low Energy (BLE) communication.

In some embodiments, the first wireless communication technology may use 900 MHz communication.

In some embodiments, the system may further include a second smart antenna communicatively coupled with and powered by the Power-over-Ethernet network switch, wherein the second smart antenna is configured to communicate with the first set of access control devices using the first wireless communication technology, and wherein the second smart antenna is communicatively coupled with the first smart antenna in a daisy chained configuration relative to the first port of the Power-over-Ethernet network switch.

In some embodiments, the first wireless communication technology may use one of Bluetooth Low Energy (BLE) communication or 900 MHz communication.

In some embodiments, the system may further include a second smart antenna communicatively coupled with and powered by the Power-over-Ethernet network switch at a second port of the Power-over-Ethernet network switch different from the first port, wherein the second smart antenna is configured to communicate with a second set of access control devices of the plurality of access control devices different from the first set of access control devices using a second wireless communication technology different from the first wireless communication technology.

In some embodiments, the first wireless communication technology may use one of Bluetooth Low Energy (BLE) communication or 900 MHz communication and the second wireless communication technology may use another of Bluetooth Low Energy (BLE) communication or 900 MHz communication.

In some embodiments, the smart communication manager may be a standalone computing device.

According to yet another embodiment, a network switch communicatively coupled to a headend access control system configured to manage access control data associated with a plurality of access control devices, the plurality of access control devices including corresponding lock mechanisms configured to control access through corresponding passageways, may include at least one processor and at least one memory comprising a plurality of instructions stored therein that, in response to execution by the at least one processor, causes the network switch to execute an operating system of the network switch, and a smart communication manager that includes an application programming interface accessible by the headend access control system and that translates data received from the headend access control system into payloads readable by one or more of the plurality of access control devices.

In some embodiments, the smart communication manager may be a containerized software application executable by the at least one processor.

This summary is not intended to identify key or essential features of the claimed subject matter, nor is it intended to be used as an aid in limiting the scope of the claimed subject matter. Further embodiments, forms, features, and aspects of the present application shall become apparent from the description and figures provided herewith.

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, references labels have been repeated among the figures to indicate corresponding or analogous elements.

DETAILED DESCRIPTION

Figure 1:
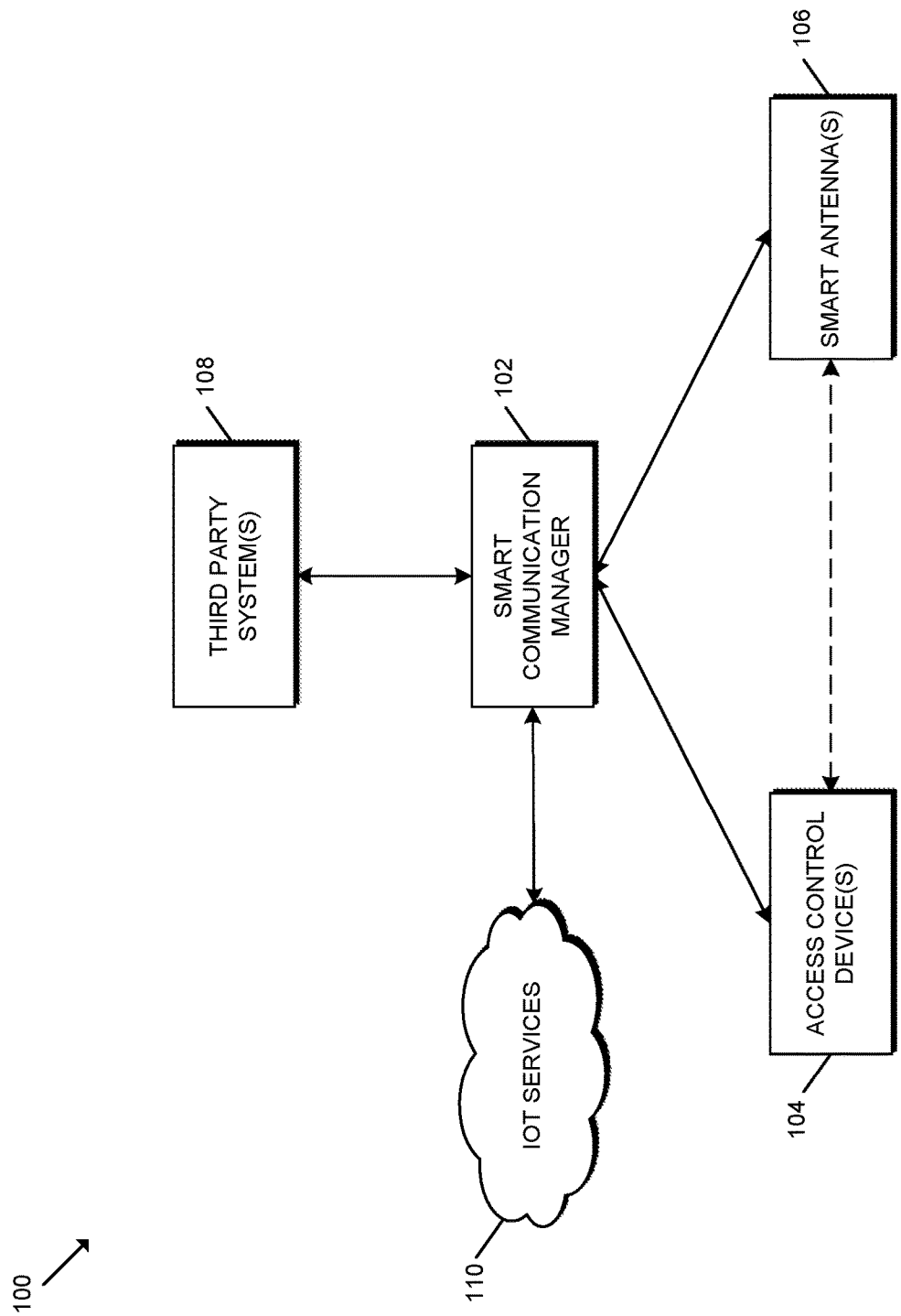
FIG. 1 is a simplified block diagram of at least one embodiment of a system for employing an integrated access control solution.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described. Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

Referring now to FIG. 1, in the illustrative embodiment, a system 100 for employing an integrated access control solution is shown. The illustrative system 100 includes a smart communication manager 102, one or more access control devices 104, one or more smart antennas 106, one or more third party systems 108, and IoT services 110. It should be appreciated that the system 100 is depicted as a high level architecture/system and, therefore, one or more of the devices/components of the system 100 may be form a portion of other devices/components, be embodied as hardware/firmware/software, and/or be otherwise embodied. It should be further appreciated that, in some embodiments, the system 200 of FIG. 2, the system 300 of FIG. 3, the system 400 of FIG. 4, and/or the system 500 of FIG. 5 may be embodied as an implementation of the high level system 100 of FIG. 1. Further, in some embodiments, one or more of features of the system 200 of FIG. 2, the system 300 of FIG. 3, the system 400 of FIG. 4, and/or the system 500 of FIG. 5 may be incorporated into the same embodiment.

As described in greater detail below, the system 100 allows for the integration of access control communication and control logic into network gears (e.g., access points, network switches, routers, firewalls, hubs, PoE switches, and/or other devices for networking or interconnectivity) and/or other devices via the smart communication manager 102. In some embodiments, the logic of the smart communication manager 102 may leverage existing hardware capabilities such as wireless communications to communicate with wireless locks and/or Power-over-Ethernet (PoE) locks.

It should be appreciated that the system 100 significantly lowers the costs to implement real-time connected access control and provides a single interface (e.g., via the smart communication manager 102 and/or APIs thereof) for all devices regardless of the technology used in the device. Accordingly, access control partners and/or other integration partners are able to integrate a single time for all device types, rather than integrating separately for each different device type, while also providing for consistent user experiences and enforcing similar (or the same) capabilities for all integrations with that partner.

In some implementations, the techniques described herein involve providing logic (e.g., as object code or an application) to be integrated into existing devices capable of communicating with one or more series/type of access control device (e.g., the access control devices 104). For example, in a multi-family access control system implementation, the logic (e.g., for the smart communication manager 102) may execute on existing smart apartment hubs (e.g., the smart hub/router 302 of FIG. 3) to handle communications with the respective access control devices (e.g., the access control devices 308). In another embodiment, the logic may be incorporated into and execute on an existing network gear (e.g., the network switch 402 of FIG. 4 and/or the PoE switch 502 of FIG. 5) to provide communications over existing IT network infrastructure rather than using a traditional approach of installing a redundant network dedicated to access control.

It should be appreciated that the smart communication manager 102, the access control device(s) 104, the smart antenna(s) 106, the third party system(s) 108, and/or the IoT services 110 may be embodied as, or form a portion of, any type of device/system or collection of devices/systems suitable for performing the functions described herein. More specifically, in the illustrative embodiment, the smart communication manager 102 provides a simple interface through which third party systems 108 (e.g., integration partner applications) can communicate with the access control devices 104 (e.g., of various types/series with different communication protocols). Accordingly, the smart communication manager 102 may receive data and/or commands received from the third party system 108 and/or another external system (e.g., via an API) directed to a particular access control device 104, and the smart communication manager 102 may translate that data/command to the device-specific protocol associated with the corresponding access control device 104 and provide the appropriate payload corresponding with the data/command and protocol for receipt by the access control device 104. In some embodiments, the smart communication manager 102 may transmit that payload to a device (e.g., access point, smart antenna 106, and/or other device) equipped with the relevant communication circuitry (e.g., 900 MHz wireless antenna and chipset, BLE chipset and antenna, etc.) and/or other technologies needed to communicate with the access control device 104 via the device-specific protocol. Accordingly, the smart communication manager 102 may manage multiple, simultaneous partner connections including connections with the third party systems 108 and/or one or more Internet of Things (IoT) services 110. Depending on the context and the particular embodiment, the smart communication manager 102 may be embodied as and described herein as one or more of a software development kit (SDK), software library, logic bundle, firmware, and/or a dedicated device/component.

In the illustrative embodiment, each of the one or more access control devices 104 may be embodied as any type of device capable of controlling access through a passageway. For example, in some embodiments, the access control device 104 may be embodied as an electronic lock (e.g., a mortise lock, a cylindrical lock, or a tubular lock), gate opener, exit device, auto-operator, garage door opener, or a peripheral controller of a passageway. Depending on the particular embodiment, the access control device 104 may include a credential reader or be electrically/communicatively coupled to a credential reader configured to receive access credentials (e.g., from a mobile device or physical credential card). In some embodiments, the access control device 104 may be configured to manage access credentials that may be used to gain access through the passageway secured by the access control device 104. For example, the access control device 104 may store updated authorized credentials, whitelists, blacklists, device parameters, and/or other suitable data.

Each of the one or more smart antennas 106 may be embodied as any type of device capable of wirelessly communicating with one or more access control devices 104 over a corresponding wireless technology/protocol. For example, in various embodiments, the smart antenna 106 may be configured to communicate over Bluetooth (e.g., including Bluetooth Low Energy (BLE)), 900 MHz, Wi-Fi, WiMAX, Ultra-Wide Band (UWB), ZigBee, Z-Wave, and/or another suitable wireless communication technology/protocol. Further, in some embodiments, the smart antenna 106 may also be configured to communicate with the smart communication manager 102 via one or more wired and/or wireless communication technologies/protocols. It should be appreciated that, in some embodiments, the smart antenna 106 may provide the "last link" of communication from the third party systems 108, the IoT services 110, and/or other systems to the access control device 104. In some embodiments, the smart antenna 106 may include a smart antenna SDK, software library, firmware, and/or other logic that allows for the simple interface between the third party system 108 and the access control device 104.

Each of the third party systems 108 may be embodied as any type of system or solution capable of integrating with an access control device 104. For example, in some embodiments, each of the third party systems 108 may be embodied as a separate access control solution that integrates with one or more access control devices 104 in order to provide a security solution to its customers. In various embodiments, the third party system 108 may be the system of an entity associated with a whole home automation system, a dedicated access control system, a smart hub/router, a multi-family hardware integrator, and/or another system capable of performing the functions described herein.

The IoT services 110 may be embodied as any type of IoT-related service/system consistent with the features described herein. As shown, the illustrative IoT services 110 are configured to communicate directly with the smart communication manager 102 or device on which the smart communication manager 102 is stored/executed depending on the particular embodiment. Accordingly, it should be appreciated that by integrating both the IoT services 110 and the third party systems 108 with the smart communication manager 102, the end users of the third party systems 108 (e.g., users who interact with the access control devices 104) may utilize the IoT services 110 without the third party systems 108 having to separately integrate with those services, as would be traditionally required. As such, the end users are able to gain access to IoT services 110 that a third party system 108 may have no interest in integrating (e.g., due to the additional feature providing insufficient business value to justify the cost of integration). In some embodiments, IoT services 110 may include, for example, firmware update management, package delivery services, visitor management services, dog walking services, services access, and/or other services that may need access to a particular access control device 104 (e.g., through authorization by the user and/or for the benefit of the user).

It should be further appreciated that, although the systems/services of the system 100 are described herein as computing systems outside of a cloud computing environment, in other embodiments, one or more of the systems/services may be embodied as or form a portion of a cloud-based device or collection of devices within a cloud computing environment. Further, in cloud-based embodiments, the relevant systems/services may be embodied as a server-ambiguous computing solution, for example, that executes a plurality of instructions on-demand, contains logic to execute instructions only when prompted by a particular activity/trigger, and does not consume computing resources when not in use. That is, the systems/services may be embodied as a virtual computing environment residing "on" a computing system (e.g., a distributed network of devices) in which various virtual functions (e.g., Lambda functions, Azure functions, Google cloud functions, and/or other suitable virtual functions) may be executed correspondingly with the functions of the systems/services described herein. For example, when an event occurs (e.g., data is transferred to the systems/services for handling), the virtual computing environment may be communicated with (e.g., via a request to an API of the virtual computing environment), whereby the API may route the request to the correct virtual function (e.g., a particular server-ambiguous computing resource) based on a set of rules. As such, when a request for the transmission of data is made (e.g., via an appropriate user interface to the systems/services the appropriate virtual function(s) may be executed to perform the actions before eliminating the instance of the virtual function(s).

It should be appreciated that each of the smart communication manager 102, the access control device(s) 104, the smart antenna(s) 106, third party system(s) 108, and/or the IoT services 110 may be embodied as or form a portion of a computing device/system similar to the computing system 600 described below in reference to FIG. 6. For example, in the illustrative embodiment, one or more of the smart communication manager 102, the access control device(s) 104, the smart antenna(s) 106, third party system(s) 108, and/or the IoT services 110 may include a processing device 602 and a memory 606 having stored thereon operating logic 608 for execution by the processing device 602 for operation of the corresponding device.

Figure 2:
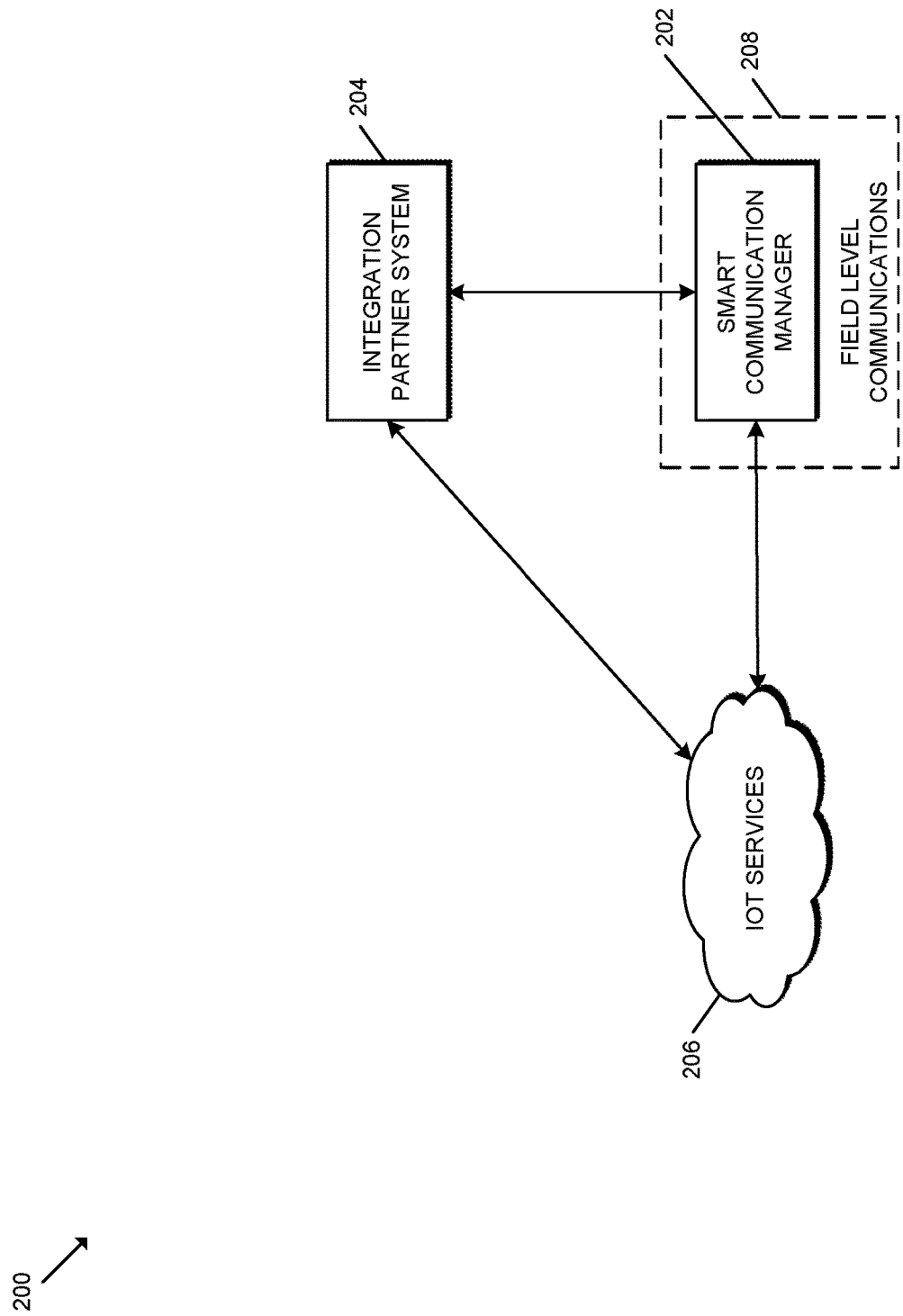
FIG. 2 is a simplified block diagram of at least one embodiment of a system for employing an integrated access control solution.

Referring now to FIG. 2, in the illustrative embodiment, a system 200 for employing an integrated access control solution is shown. The illustrative system 200 includes a smart communication manager 202, an integration partner system 204, and IoT services 206. It should be appreciated that the smart communication manager 202, the integration partner system 204, and/or the IoT services 206 may be embodied as, or form a portion of, any type of device/system or collection of devices/systems suitable for performing the functions described herein. Further, as shown in FIG. 2, the illustrative smart communication manager 202 is associated with field level communications 208.

As described above, in some embodiments, the system 200 may be an embodiment of the system 100. Accordingly, it should be appreciated that the smart communication manager 202 of FIG. 2 may be similar to the smart communication manager 102 of FIG. 1 and/or the IoT services 206 of FIG. 2 may be similar to the IoT services 110 of FIG. 1. Similarly, the integration partner system 204 of FIG. 2 may be embodied as a third party system (e.g., of the third party systems 108 of FIG. 1) that acts as an access control integration partner for access control devices (e.g., the access control devices 104) via the smart communication manager 202. Therefore, the description of those systems/services are equally applicable and have not been fully repeated herein for brevity of the description.

As indicated above, in some embodiments, the IoT services 206 may include, for example, firmware update management, package delivery services, visitor management services, dog walking services, services access, and/or other services that may need access to a particular access control device (e.g., through authorization by the user and/or for the benefit of the user). Further, in some embodiments, the IoT services 206 may include partner-specific features/services for the integration partner. For example, in some embodiments, such IoT services 206 may include audit reporting, system reporting, notification systems, product support, and/or other partner-relevant functionality. In the illustrative embodiment, the smart communication manager 202 allows the integration partner system 204 to access both the partner-specific IoT services and the user-relevant (e.g., but partner-irrelevant) IoT services via the same interface/API.

By way of example, suppose the IoT services 206 includes a package delivery service. The user may sign up for the package delivery service through the IoT services 206 (e.g., via a cloud interface) without the involvement of the integration partner system 204 that manages the user's access control devices. When the delivery service arrives at the user's door (e.g., the corresponding access control device), the IoT services 206 may send a command/message to the smart communication manager 202 via the corresponding API that says effectively "Package Delivery Service DS is at Door D and would like to access the door." The secure communication module 202 may transmit the message to the integration partner system 204 for authentication of the access request. Upon authentication by the integration partner system 204, the smart communication manager 202 transmits a command to the access control device to unlock the door, and the access control device acts accordingly. Accordingly, it should be appreciated that the integration partner system 204 is able to passively interact with the IoT service 206 without ever directly integrating with that service 206.

It should be appreciated that each of the smart communication manager 202, the integration partner system 204, and the IoT services 206 may be embodied as or form a portion of a computing device/system similar to the computing system 600 described below in reference to FIG. 6. For example, in the illustrative embodiment, one or more of the smart communication manager 202, the integration partner system 204, and/or the IoT services 206 may include a processing device 602 and a memory 606 having stored thereon operating logic 608 for execution by the processing device 602 for operation of the corresponding device.

Figure 3:
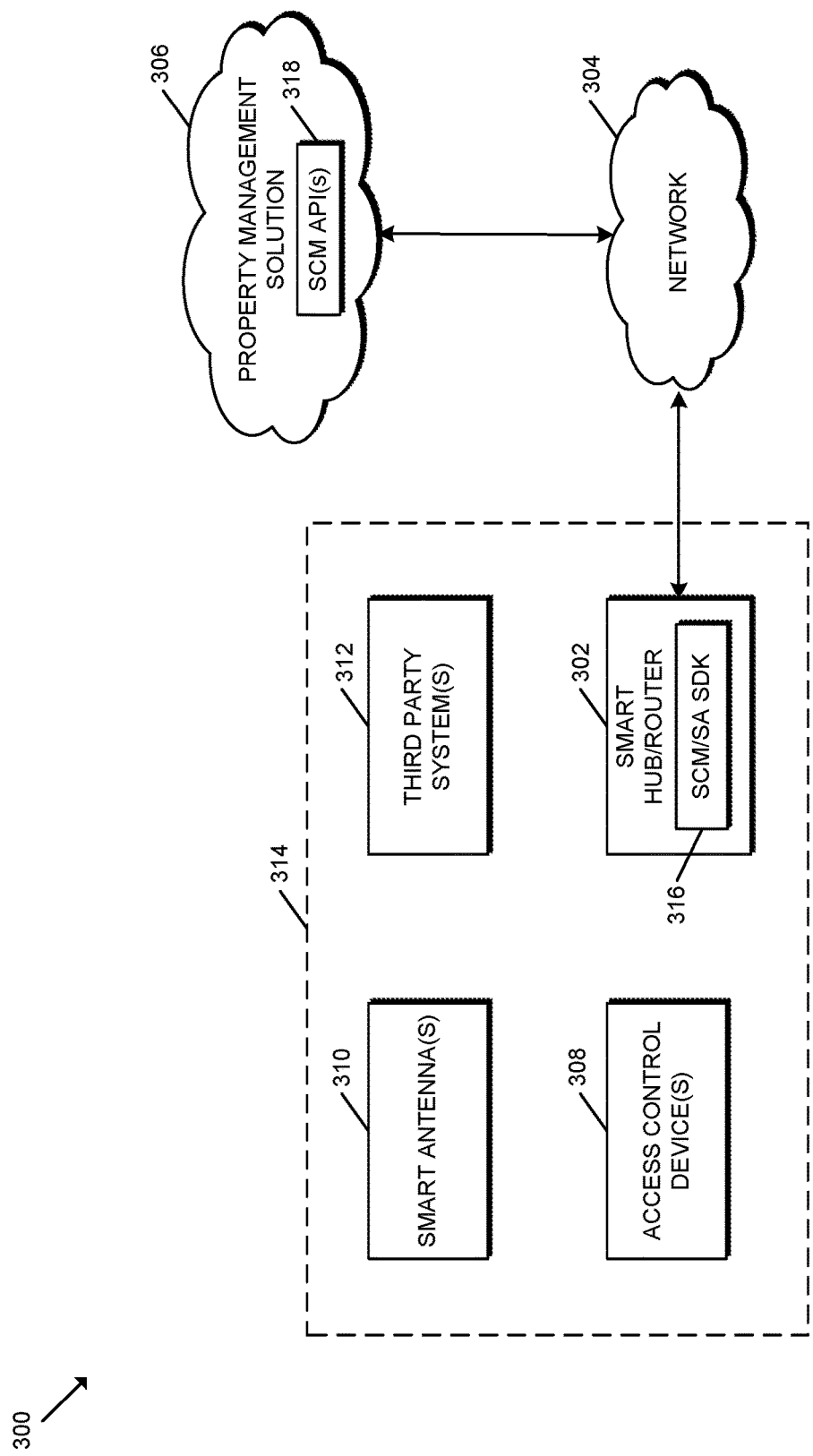
FIG. 3 is a simplified block diagram of at least one embodiment of a system for multi-family hardware integration.

Referring now to FIG. 3, in the illustrative embodiment, a system 300 for multi-family hardware integration is shown. The illustrative system 300 includes a smart hub/router 302, a network 304, a property management solution 306, one or more access control devices 308, one or more smart antennas 310, and one or more third party systems 312. It should be appreciated that the smart hub/router 302, the network 304, the property management solution 306, the access control device(s) 308, the smart antenna(s) 310, and/or the third party system(s) 312 may be embodied as, or form a portion of, any type of device/system or collection of devices/systems suitable for performing the functions described herein. Additionally, the illustrative smart hub/router 302 includes a secure communication manager and/or secure antenna (SCM/SA) SDK 316, and the property management solution 306 includes SCM API(s) 318. Further, as shown in FIG. 3, the illustrative smart hub/router 302, access control device(s) 308, smart antenna(s) 310, and/or third party system(s) 312 are associated with a multi-family access control environment 314.

As described above, in some embodiments, the system 300 may be an embodiment of the system 100. Accordingly, it should be appreciated that the access control device(s) 308 of FIG. 3 may be similar to the access control device(s) 104 of FIG. 1, the smart antenna(s) 310 of FIG. 3 may be similar to the smart antenna(s) 106 of FIG. 1, and/or the third party system(s) 312 of FIG. 3 may be similar to the third party system(s) 108 of FIG. 1. Similarly, the smart hub/router 302 may be embodied as or include features of a smart communication manager similar to the smart communication manager 102 of FIG. 1 (e.g., in the form of the SCM/SA SDK 316). Therefore, the description of those systems/services are equally applicable and have not been fully repeated herein for brevity of the description.

The network 304 may be embodied as any one or more types of communication networks that are capable of facilitating communication between the various devices communicatively connected via the network 304. As such, the network 304 may include one or more networks, routers, switches, access points, hubs, computers, and/or other intervening network devices. For example, the network 304 may be embodied as or otherwise include one or more cellular networks, telephone networks, local or wide area networks, publicly available global networks (e.g., the Internet), ad hoc networks, short-range communication links, or a combination thereof.

It should be appreciated that various access control integration partners have property management solutions 306 that interact with a smart hub/router 302 for communication with various third party system 312 devices in a smart home or smart apartment, such as smart thermostats, lighting systems, alarm systems, camera systems, audiovisual systems, home automation systems, and/or other smart devices/systems. However, the smart hub/router 302 is generally unable to communicate with any of the on-premises access control devices 308, for example, due to those devices being in an "offline" access control mode in which they process credentials presented without external communication with a headend system and/or the smart hub/router 302 not having the ability to communicate using the relevant communication technologies and/or device-specific protocols.

In the illustrative embodiment, the SCM/SA SDK 316 is stored on the smart hub/router 302 as an SDK, software library, logic bundle, firmware, and/or otherwise, and provides an interface for communicating directly with the access control devices 308 (e.g., assuming the smart hub/router 302 includes the relevant communication circuitry/technologies for communicating with the access control devices 308) and/or indirectly with the access control devices 308 via the smart antenna(s) 310, which in turn include the relevant communication circuitry/technologies for communicating with the corresponding access control devices 308. Further, the integration partner may leverage the counterpart SCM API(s) 318 of the property management solution 306 to communicate with the access control devices 308 via the corresponding interfaces. As such, the system 300 allows for the integration partners to communicate with the access control devices 308, for example, to dynamically change data on the access control device 308 (e.g., in the access control database), remotely lock/unlock the corresponding lock mechanism (e.g., for lockdowns, delivery services, etc.), perform multi-factor authentication, and/or for other purposes. Even if the multi-family environment 314 includes access control devices 308 of different types, the SCM/SA SDK 316 and the SCM API(s) 318 allow for the integration partner to communicate using a single interface without knowledge regarding the nuances of the communication protocols of those different types of devices. In some embodiments, the system 300 also allows for the secure operation without specifically commissioning the smart antenna(s) 310 and/or the smart hub/router 302.

It should be appreciated that each of the smart hub/router 302, the network 304, the property management solution 306, the access control device(s) 308, the smart antenna(s) 310, and the third party system(s) 312 may be embodied as or form a portion of a computing device/system similar to the computing system 600 described below in reference to FIG. 6. For example, in the illustrative embodiment, one or more of the smart hub/router 302, the network 304, the property management solution 306, the access control device(s) 308, the smart antenna(s) 310, and/or the third party system(s) 312 may include a processing device 602 and a memory 606 having stored thereon operating logic 608 for execution by the processing device 602 for operation of the corresponding device.

Figure 4:
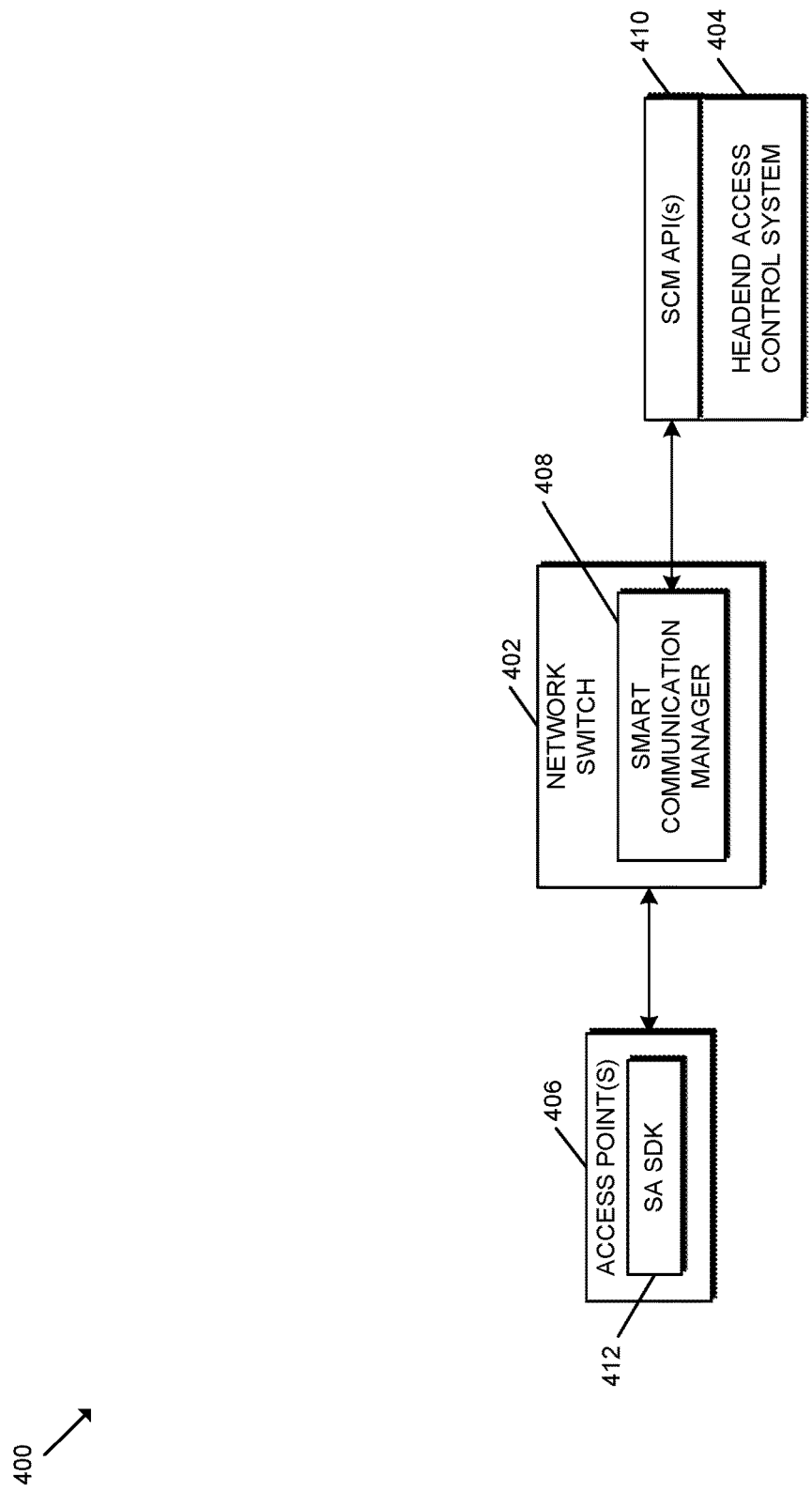
FIG. 4 is a simplified block diagram of at least one embodiment of a system for embedding access control logic into a network gear.

Referring now to FIG. 4, in the illustrative embodiment, a system 400 for embedding access control logic into a network gear is shown. The illustrative system 400 includes a network switch 402, a headend access control system 404, and one or more access points 406. It should be appreciated that the network switch 402, the headend access control system 404, and/or the access point(s) 406 may be embodied as, or form a portion of, any type of device/system or collection of devices/systems suitable for performing the functions described herein. Further, as shown in FIG. 4, the network switch 402 includes a smart communication manager 408, the headend access control system 404 includes SCM API(s) 410, and the access point(s) 406 include an SA SDK 412.

As described above, in some embodiments, the system 400 may be an embodiment of the system 100. Accordingly, it should be appreciated that the smart communication manager 408 may be embodied as or include features similar to the smart communication manager 102 of FIG. 1. Therefore, the description of those systems/services are equally applicable and have not been fully repeated herein for brevity of the description.

In the illustrative embodiment, the network switch 402 is embodied as any device capable of facilitating networking functionality between the headend access control system 404 and the access point(s) 406. Each of the access points 406 may be embodied as any networking device that allows for one or more access control devices to communicate with the headend access control system 404 (e.g., via the network switch 402). For example, the access point 406 may be embodied as a wireless access point (WAP) and/or router in some embodiments. It should be appreciated that the access point 406 may be configured to communicate with the access control devices and/or smart antennas via one or more wireless technologies/protocols depending on the particular embodiment. For example, in various embodiments, the access point 406 may allow for communication over Bluetooth (e.g., including Bluetooth Low Energy (BLE)), 900 MHz, Wi-Fi, WiMAX, Ultra-Wide Band (UWB), Zig-Bee, Z-Wave, and/or another suitable wireless communication technology/protocol.

The illustrative headend access control system 404 may be embodied as any device/system capable of performing access control decisions and/or managing access control data associated with the system 400. For example, in some embodiments, the headend access control system 404 may be configured to manage access credentials that may be used to gain access through passageways secured by access control devices. For example, the headend access control system 404 may be responsible for ensuring that the access control devices have updated authorized credentials, whitelists, blacklists, device parameters, and/or other suitable data. Additionally, in some embodiments, the headend access control system 404 may receive security data, audit data, raw sensor data, and/or other suitable data from the access control devices for management of the access control system. In some embodiments, the headend access control system 404 may communicate with multiple access control devices at a single site (e.g., a particular building) and/or across multiple sites. That is, in such embodiments, the headend access control system 404 may be configured to receive data from access control devices distributed across a single building, multiple buildings on a single campus, or across multiple locations. In some embodiments, the headend access control system 404 may be embodied as or include an access control management server and/or and access control panel.

As depicted, the illustrative network switch 402 of the system 400 includes the smart communication manager 408. In some embodiments, the smart communication manager 408 may be stored on the network switch 402 in the form of an SDK, software library, logic bundle, or otherwise. However, in the illustrative embodiment, the smart communication manager 408 is embodied as a fully executing software application that leverages such code and is hosted on the network switch 402 as a "containerized" application (e.g., executing alongside the operating system of the network switch 402). It should be further appreciated that the SA SDK 412 may be stored on the access point(s) 406 and provide an interface for communicating with one or more smart antennas, for example, to provide the last link of communication with the relevant access control devices (e.g., for embodiments in which the access point(s) 406 do not have the relevant wireless communication circuitry/technologies).

It should be appreciated that each of the network switch 402, the headend access control system 404, and the access point(s) 406 may be embodied as or form a portion of a computing device/system similar to the computing system 600 described below in reference to FIG. 6. For example, in the illustrative embodiment, one or more of the network switch 402, the headend access control system 404, and/or the access point(s) 406 may include a processing device 602 and a memory 606 having stored thereon operating logic 608 for execution by the processing device 602 for operation of the corresponding device.

Figure 5:
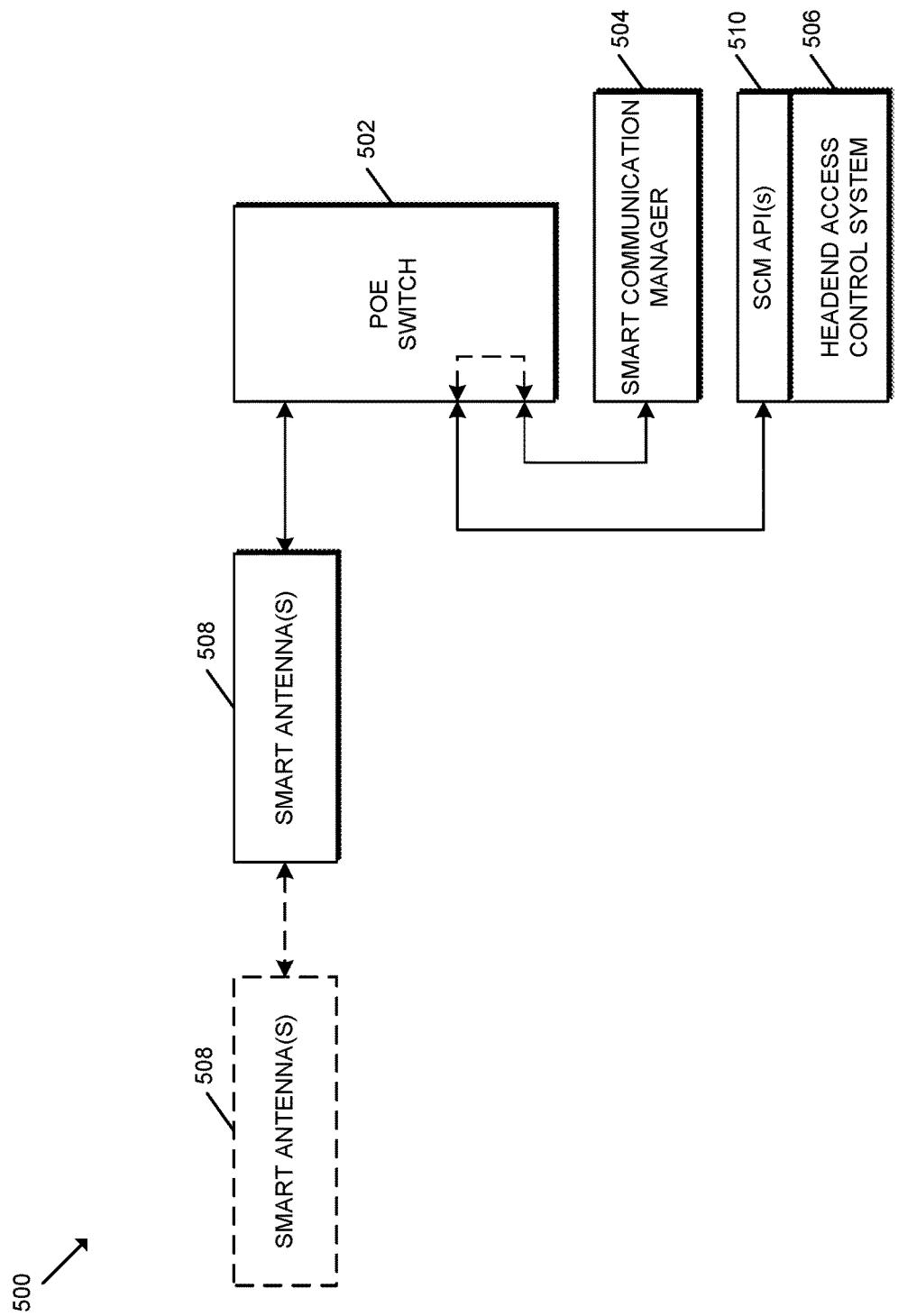
FIG. 5 is a simplified block diagram of at least one embodiment of a system for institutional integration of access control logic.

Referring now to FIG. 5, in the illustrative embodiment, a system 500 for institutional integration of access control logic is shown. The illustrative system 500 includes a PoE switch 502, a smart communication manager 504, a headend access control system 506, and one or more smart antennas 508. It should be appreciated that the PoE switch 502, the smart communication manager 504, the headend access control system 50, and the smart antenna(s) 508 may be embodied as, or form a portion of, any type of device/system or collection of devices/systems suitable for performing the functions described herein. Further, as shown in FIG. 5, the headend access control system 506 includes SCM API(s) 510.

As described above, in some embodiments, the system 500 may be an embodiment of the system 100. Accordingly, it should be appreciated that the smart communication manager 504 of FIG. 5 may be similar to the smart communication manager 102 of FIG. 1 (e.g., embodied as a standalone version of the smart communication manager 102) and/or the smart antenna(s) 508 of FIG. 5 may be similar to the smart antenna(s) 106 of FIG. 1. It should be further appreciated that the headend access control system 506 of FIG. 5 may be similar to the headend access control system 404 of FIG. 4. Therefore, the description of those systems/services are equally applicable and have not been fully repeated herein for brevity of the description.

It should be appreciated that the PoE switch 502 may be embodied as any device capable of facilitating network functionality between devices while also including the ability to transmit electrical power to such devices using Power-over-Ethernet (PoE) technology. Accordingly, in some embodiments, the PoE switch 502 may be a network switch (e.g., the network switch 402) with PoE capabilities. As depicted in FIG. 5, in some embodiments, multiple smart antennas 508 may be daisy chained via PoE connections in order to pass both power and data between those smart antennas 508 off the same port of the PoE switch 502. For example, in some embodiments, the system 500 may include multiple BLE-capable smart antennas 508 daisy chained to one port of the PoE switch 502 and multiple 900 MHz-capable smart antennas 508 daisy chained to another port of the PoE switch 502. In another embodiment, the communication frequencies of the smart antennas 508 daisy chained to a particular port of the PoE switch 502 may vary.

It should be appreciated that each of the PoE switch 502, the smart communication manager 504, the headend access control system 50, and the smart antenna(s) 508 may be embodied as or form a portion of a computing device/system similar to the computing system 600 described below in reference to FIG. 6. For example, in the illustrative embodiment, one or more of the PoE switch 502, the smart communication manager 504, the headend access control system 50, and/or the smart antenna(s) 508 may include a processing device 602 and a memory 606 having stored thereon operating logic 608 for execution by the processing device 602 for operation of the corresponding device.

Figure 6:
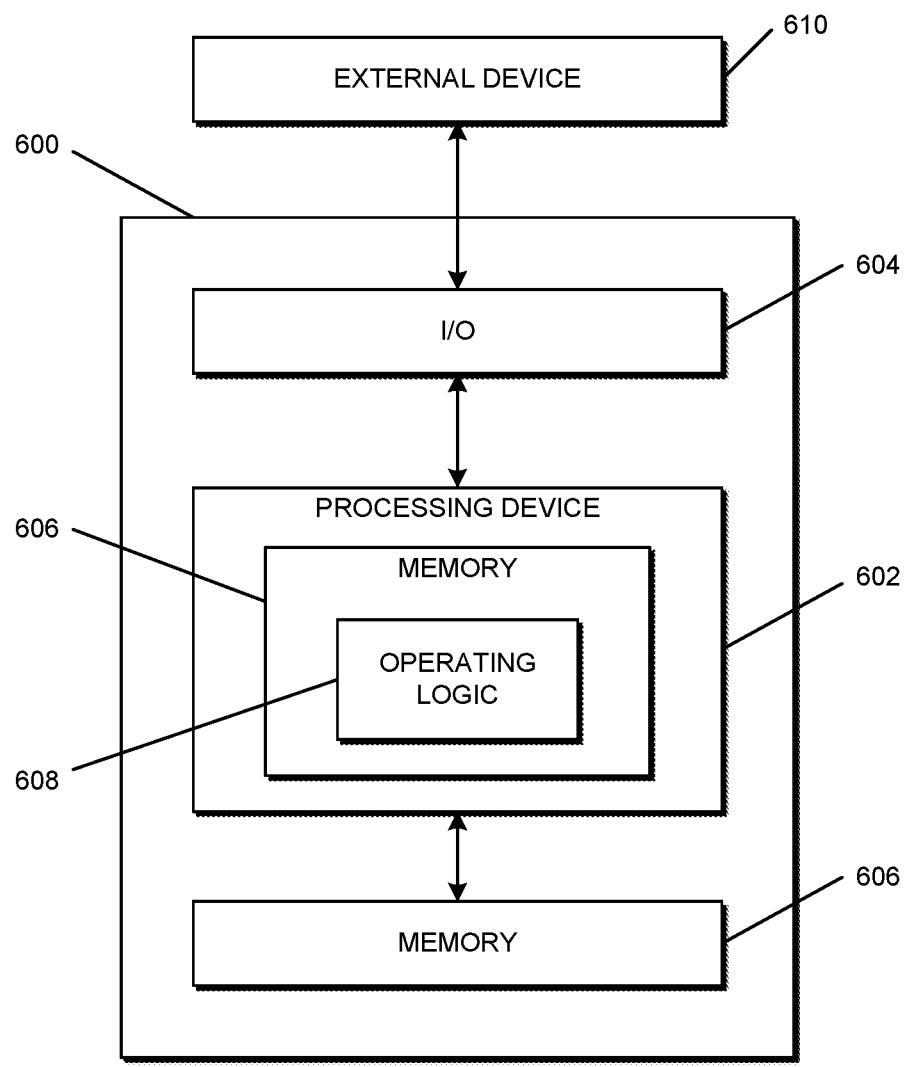
FIG. 6 is a simplified block diagram of at least one embodiment of a computing system.

Referring now to FIG. 6, a simplified block diagram of at least one embodiment of a computing system 600 is shown. The illustrative computing system 600 depicts at least one embodiment of a computing device/system that may be utilized in connection with the smart communication manager 102, the access control device(s) 104, the smart antenna(s) 106, third party system(s) 108, the IoT services 110, the smart communication manager 202, the integration partner system 204, the IoT services 206, the smart hub/router 302, the network 304, the property management solution 306, the access control device(s) 308, the smart antenna(s) 310, the third party system(s) 312, the network switch 402, the headend access control system 404, the access point(s) 406, the PoE switch 502, the smart communication manager 504, the headend access control system 506, and/or the smart antenna(s) 508 illustrated in FIGS. 1-5. Depending on the particular embodiment, the computing system 600 may be embodied as an integrated computing device, server, desktop computer, mobile computing device, laptop computer, tablet computer, notebook, netbook, Ultrabook™, cellular phone, smartphone, wearable computing device, onboard vehicle computing system, personal digital assistant, Internet of Things (IoT) device, control panel, router, gateway, and/or any other computing, processing, and/or communication device capable of performing the functions described herein.

The computing system 600 includes a processing device 602 that executes algorithms and/or processes data in accordance with operating logic 608, an input/output device 604 that enables communication between the computing system 600 and one or more external devices 610, and memory 606 which stores, for example, data received from the external device 610 via the input/output device 604.

The input/output device 604 allows the computing system 600 to communicate with the external device 610. For example, the input/output device 604 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry may be configured to use any one or more communication technologies (e.g., wireless or wired communications) and associated protocols (e.g., Ethernet, Bluetooth®, Wi-Fi®, WiMAX, Ultra-Wide Band, etc.) to effect such communication depending on the particular computing system 600. The input/output device 604 may include hardware, software, and/or firmware suitable for performing the techniques described herein.

The external device 610 may be any type of device that allows data to be inputted or outputted from the computing system 600. For example, in various embodiments, the external device 610 may be embodied as the smart communication manager 102, the access control device(s), the smart antenna(s) 106, third party system(s) 108, the IoT services 110, the smart communication manager 202, the integration partner system 204, the IoT services 206, the smart hub/router 302, the network 304, the property management solution 306, the access control device(s) 308, the smart antenna(s) 310, the third party system(s) 312, the network switch 402, the headend access control system 404, the access point(s) 406, the PoE switch 502, the smart communication manager 504, the headend access control system 506, and/or the smart antenna(s) 508. Further, in some embodiments, the external device 610 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 610 may be integrated into the computing system 600.

The processing device 602 may be embodied as any type of processor(s) capable of performing the functions described herein. In particular, the processing device 602 may be embodied as one or more single or multi-core processors, microcontrollers, or other processor or processing/controlling circuits. For example, in some embodiments, the processing device 602 may include or be embodied as an arithmetic logic unit (ALU), central processing unit (CPU), digital signal processor (DSP), and/or another suitable processor(s). The processing device 602 may be a programmable type, a dedicated hardwired state machine, or a combination thereof. Processing devices 602 with multiple processing units may utilize distributed, pipelined, and/or parallel processing in various embodiments. Further, the processing device 602 may be dedicated to performance of just the operations described herein, or may be utilized in one or more additional applications. In the illustrative embodiment, the processing device 602 is of a programmable variety that executes algorithms and/or processes data in accordance with operating logic 608 as defined by programming instructions (such as software or firmware) stored in memory 606. Additionally, or alternatively, the operating logic 608 for processing device 602 may be at least partially defined by hardwired logic or other hardware. Further, the processing device 602 may include one or more components of any type suitable to process the signals received from input/output device 604 or from other components or devices and to provide desired output signals. Such components may include digital circuitry, analog circuitry, or a combination thereof.

The memory 606 may be of one or more types of non-transitory computer-readable media, such as a solid-state memory, electromagnetic memory, optical memory, or a combination thereof. Furthermore, the memory 606 may be volatile and/or nonvolatile and, in some embodiments, some or all of the memory 606 may be of a portable variety, such as a disk, tape, memory stick, cartridge, and/or other suitable portable memory. In operation, the memory 606 may store various data and software used during operation of the computing system 600 such as operating systems, applications, programs, libraries, and drivers. It should be appreciated that the memory 606 may store data that is manipulated by the operating logic 608 of processing device 602, such as, for example, data representative of signals received from and/or sent to the input/output device 604 in addition to or in lieu of storing programming instructions defining operating logic 608. As shown in FIG. 6, the memory 606 may be included with the processing device 602 and/or coupled to the processing device 602 depending on the particular embodiment. For example, in some embodiments, the processing device 602, the memory 606, and/or other components of the computing system 600 may form a portion of a system-on-a-chip (SoC) and be incorporated on a single integrated circuit chip.

In some embodiments, various components of the computing system 600 (e.g., the processing device 602 and the memory 606) may be communicatively coupled via an input/output subsystem, which may be embodied as circuitry and/or components to facilitate input/output operations with the processing device 602, the memory 606, and other components of the computing system 600. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing system 600 may include other or additional components, such as those commonly found in a typical computing device (e.g., various input/output devices and/or other components), in other embodiments. It should be further appreciated that one or more of the components of the computing system 600 described herein may be distributed across multiple computing devices. In other words, the techniques described herein may be employed by a computing system that includes one or more computing devices. Additionally, although only a single processing device 602, I/O device 604, and memory 606 are illustratively shown in FIG. 6, it should be appreciated that a particular computing system 600 may include multiple processing devices 602, I/O devices 604, and/or memories 606 in other embodiments. Further, in some embodiments, more than one external device 610 may be in communication with the computing system 600.

What is claimed is:

1. A system, comprising:
    a plurality of access control devices including corresponding lock mechanisms configured to control access through corresponding passageways;
    a headend access control system configured to manage access control data associated with the plurality of access control devices;
    a Power-over-Ethernet network switch communicatively coupled to the headend access control system;
    a smart communication manager communicatively coupled to the Power-over-Ethernet network switch and including an application programming interface accessible by the headend access control system and configured to translate data received from the headend access control system into payloads readable by the plurality of access control devices; and
    a first smart antenna communicatively coupled with and powered by the Power-over-Ethernet network switch at a first port of the Power-over-Ethernet network switch, wherein the first smart antenna is configured to communicate with a first set of access control devices of the plurality of access control devices using a first wireless communication technology; and
    further comprising a second smart antenna communicatively coupled with and powered by the Power-over-Ethernet network switch, wherein the second smart antenna is configured to communicate with the first set of access control devices using the first wireless communication technology, and wherein the second smart antenna is communicatively coupled with the first smart antenna in a daisy chained configuration relative to the first port of the Power-over-Ethernet network switch.

2. The system of claim 1, wherein the smart communication manager comprises a containerized software application executable by the network switch.

3. The system of claim 1, wherein the smart communication manager is communicatively integrated with at least one Internet of Things (IoT) service.

4. The system of claim 1, wherein the first wireless communication technology uses Bluetooth Low Energy (BLE) communication.

5. The system of claim 1, wherein the smart communication manager is a standalone computing device.

6. The system of claim 1, further comprising a third smart antenna communicatively coupled with and powered by the Power-over-Ethernet network switch at a second port of the Power-over-Ethernet network switch different from the first port, wherein the third smart antenna is configured to communicate with a second set of access control devices of the plurality of access control devices different from the first set of access control devices using a second wireless communication technology different from the first wireless communication technology.

7. The system of claim 6, wherein the first wireless communication technology uses one of Bluetooth Low Energy (BLE) communication, 900 MHz communication, Wi-Fi communication, ZigBee communication, or Z-Wave communication; and
    wherein the second wireless communication technology uses another one of Bluetooth Low Energy (BLE) communication, 900 MHz communication, Wi-Fi communication, ZigBee communication, or Z-Wave communication.

8. The system of claim 6, further comprising a fourth smart antenna communicatively coupled with and powered by the Power-over-Ethernet network switch, wherein the fourth smart antenna is configured to communicate with the second set of access control devices using the second wireless communication technology, and wherein the fourth smart antenna is communicatively coupled with the third smart antenna in a daisy chained configuration relative to the second port of the Power-over-Ethernet network switch.

9. The system of claim 8, wherein the first wireless communication technology uses one of Bluetooth Low Energy (BLE) communication, 900 MHz communication, Wi-Fi communication, ZigBee communication, or Z-Wave communication; and
    wherein the second wireless communication technology uses another one of Bluetooth Low Energy (BLE) communication, 900 MHz communication, Wi-Fi communication, ZigBee communication, or Z-Wave communication.

10. The system of claim 1, wherein the first wireless communication technology uses 900 MHz communication.

11. The system of claim 1, wherein the first wireless communication technology uses Ultra-Wide Band (UWB) communication.

12. The system of claim 1, wherein the first wireless communication technology uses Wi-Fi communication.

13. The system of claim 1, wherein the first wireless communication technology uses ZigBee communication.

14. The system of claim 1, wherein the first wireless communication technology uses Z-Wave communication.

15. A system, comprising:
    a plurality of access control devices including corresponding lock mechanisms configured to control access through corresponding passageways;
    a headend access control system configured to manage access control data associated with the plurality of access control devices;
    a Power-over-Ethernet network switch communicatively coupled to the headend access control system;
    a smart communication manager communicatively coupled to the Power-over-Ethernet network switch and including an application programming interface accessible by the headend access control system and configured to translate data received from the headend access control system into payloads readable by the plurality of access control devices; and
    a first smart antenna communicatively coupled with and powered by the Power-over-Ethernet network switch at a first port of the Power-over-Ethernet network switch, wherein the first smart antenna is configured to communicate with a first set of access control devices of the plurality of access control devices using a first wireless communication technology; and wherein the first wireless communication technology uses 900 MHz communication;

further comprising a second smart antenna communicatively coupled with and powered by the Power-over-Ethernet network switch at a second port of the Power-over-Ethernet network switch different from the first port, wherein the second smart antenna is configured to communicate with a second set of access control devices of the plurality of access control devices different from the first set of access control devices using a second wireless communication technology different from the first wireless communication technology; and wherein each of the first smart antenna and the second smart antenna is a standalone device.

16. The system of claim 15, wherein the first smart antenna is further configured to communicate with a third set of access control devices of the plurality of access control devices different from the first set of access control devices using a wireless communication technology different from the first wireless communication technology.

17. The system of claim 15, wherein the second wireless communication technology uses Bluetooth Low Energy (BLE) communication.

18. The system of claim 15, wherein the smart communication manager is a standalone computing device.

19. The system of claim 15, wherein the second wireless communication technology uses one of Bluetooth Low Energy (BLE) communication, Wi-Fi communication, ZigBee communication, or Z-Wave communication.

* * * * *